(12) United States Patent
Tsurumi et al.

(10) Patent No.: US 11,543,331 B2
(45) Date of Patent: Jan. 3, 2023

(54) BRAKE DUST MEASUREMENT SYSTEM AND BRAKE DUST MEASUREMENT METHOD

(71) Applicant: HORIBA, LTD., Kyoto (JP)

(72) Inventors: Kazuya Tsurumi, Kyoto (JP); Takashi Matsuyama, Kyoto (JP)

(73) Assignee: Horiba, Ltd.

( * ) Notice: Subject to any disclaimer, the term of this patent is extended or adjusted under 35 U.S.C. 154(b) by 67 days.

(21) Appl. No.: 17/057,675

(22) PCT Filed: May 15, 2019

(86) PCT No.: PCT/JP2019/019346
§ 371 (c)(1),
(2) Date: Nov. 22, 2020

(87) PCT Pub. No.: WO2019/225443
PCT Pub. Date: Nov. 28, 2019

(65) Prior Publication Data
US 2021/0199544 A1    Jul. 1, 2021

(30) Foreign Application Priority Data
May 22, 2018 (JP) .............................. JP2018-098191

(51) Int. Cl.
*G01N 1/22* (2006.01)
*G01M 17/007* (2006.01)
*G01N 3/56* (2006.01)

(52) U.S. Cl.
CPC ............ *G01N 1/22* (2013.01); *G01M 17/007* (2013.01); *G01N 3/56* (2013.01)

(58) Field of Classification Search
CPC .................. G01M 17/007; G01N 3/56; G01N 2001/2241; G01N 2015/0046; G01N 1/2226
See application file for complete search history.

(56) References Cited

FOREIGN PATENT DOCUMENTS

| DE | 4324620 A1 | 1/1995 |
|---|---|---|
| JP | 61-012045 U | 1/1986 |
| WO | 2017097901 A1 | 6/2017 |

OTHER PUBLICATIONS

Sanders (Airborne Brake Wear Debris: Size Distributions, Composition, and a Comparison of Dynamometer and Vehicle Tests, 2003; "Sanders") (Year: 2003).*

(Continued)

*Primary Examiner* — Eric S. McCall
*Assistant Examiner* — Timothy P Graves
(74) *Attorney, Agent, or Firm* — Brooks Kushman P.C.

(57) ABSTRACT

The present invention provides a brake dust measurement system that can accurately measure an amount of brake dust produced. The brake dust measurement system, in which a specimen having a brake is placed in a chamber and which measures brake dust produced from the brake, includes a sampling unit that samples air inside the chamber, an elemental analysis unit that performs elemental analysis of sampled air sampled by the sampling unit, a storage unit that stores elemental content information of a single or multiple elements contained in the brake, and a calculation unit that calculates an amount of brake dust contained in the sampled air on the basis of elemental analysis results of the elemental analysis unit and the elemental content information.

11 Claims, 5 Drawing Sheets

(56) References Cited

OTHER PUBLICATIONS

EESR dated Jan. 20, 2022 issued in EP patent application No. 19808418.8, 13 pgs.

Garg et al., "Brake wear particulate matter emissions", Environmental Science and Technology, vol. 34, No. 21, Dec. 31, 2000, pp. 4463-4469.

Akihiro Iijima et al., "Emission Factor for Antimony in Brake Abrasion Dusts as One of the Major Atmospheric Antimony Sources", Environmental Science & Technology, vol. 42, No. 8, Apr. 1, 2008, pp. 2937-2942.

Wahid Syed M Ed—Lacombe Sylvie Et, "Automotive brake wear: a review", Environmental Science and Pollution Research, Springer Berlin Heidelberg, Berlin/Heidelberg, vol. 25, No. 1, Nov. 6, 2017, pp. 174-180.

Wahlstrom J et al., "A pin-on-disc simulation of airborne wear particles from disc brakes", Wear, Elsevier Sequoia, Lausanne, CH, vol. 268, No. 5-6, Feb. 11, 2010, pp. 763-769.

Hagino Hiroyuki et al., "Airborne brake wear particle emission due to braking and accelerating", WEAR, vol. 334, Dec. 31, 2015, pp. 44-48.

Wahlstrom J et al., "A pin-on-disc investigation of novel nanoporous composite-based and conventional brake pad materials focussing on airborne wear particles", Tribology International, Elsevier Ltd, Amsterdam, NL, vol. 44, No. 12, Jul. 21, 2011, pp. 1838-1843.

Grigoratos Theodoros et al., "Brake wear particle emissions: a review", Environmental Science and Pollution Research, Springer Berlin Heidelberg, Berlin/Heidelberg, vol. 22, No. 4, Oct. 17, 2014, pp. 2491-2504.

Sanders, G. Paul, "Airborne Brake Wear Debris: Size Distributions, Composition, and a Comparison of Dynamometer and Vehicle Tests:", Environmental Science & Technology, vol. 37 No. 18, 2003, pp. 4060-4069.

Iijima, Akihiro, "Particle size and composition distribution analysis of automotive brake abrasion dusts for the evaluation of antimony sources of airborne particulate matter", Atmospheric Environment, vol. 41, 2007, pp. 4908-4919.

Augsburg, Klaus, "Investigation of Brake Wear Particles", Readout HORIBA Technical Reports, No. 39, Sep. 2012, pp. 34-39.

International Search Report dated Jul. 30, 2019 issued for International application No. PCT/JP2019/019346, 4 pgs.

\* cited by examiner

BRAKE DUST MEASUREMENT SYSTEM AND BRAKE DUST MEASUREMENT METHOD

CROSS-REFERENCE TO RELATED APPLICATIONS

This application is the U.S. national phase of PCT Application No. PCT/JP2019/019346, filed May 15, 2019, which claims priority to Japanese Patent Application No. 2018-098191, filed May 22, 2018, which are both incorporated by reference herein in their entireties.

TECHNICAL FIELD

The present invention relates to a brake dust measurement system and a brake dust measurement method.

BACKGROUND ART

It is a known practice to sample brake dust produced from a brake while a vehicle is run on a chassis dynamometer or while the brake is attached to a brake dynamometer. To sample the brake dust, for example, a funnel-like capture probe (or simply referred to as a "funnel") may be disposed near the brake, and the capture probe may sample the brake dust together with the air around the brake.

An example of testing a brake by using the brake dynamometer is disclosed by PTL 1. PTL 1 proposes that for example, air is sampled using the funnel-like capture probe and the brake dust in the air is measured by introducing the air into a particle measuring device, such as a condensation particle counter (CPC) or a diffusion charging sensor (DCS).

In a test chamber, however, there exist rubber powder and metal powder produced from various rotating systems, such as tires, and foreign matter produced from an operator. As a result, the particle measuring device measures not only brake dust but also rubber powder, metal powder, foreign matter, or the like, which makes it difficult to measure the brake dust accurately. The particle measuring device such as the CPC or the DCS only can measure the number and the size of particles and cannot accurately determine the amount of brake dust produced.

CITATION LIST

Patent Literature

PTL 1: International Publication No. 2017/097901

SUMMARY OF INVENTION

Technical Problem

Accordingly, the present invention is made to solve the above problem, and a main technical issue here is to accurately measure an amount of brake dust produced.

Solution to Problem

A brake dust measurement system according to an aspect of the present invention is a system in which a specimen having a brake is placed in a chamber and that measures brake dust produced from the brake. The brake dust measurement system includes a sampling unit that samples air inside the chamber, an elemental analysis unit that performs elemental analysis of the sampled air, a storage unit that stores elemental content information of a single or multiple elements contained in the brake, and a calculation unit that calculates an amount of brake dust contained in the sampled air on the basis of elemental analysis results of the elemental analysis unit and the elemental content information.

A brake dust measurement method according to another aspect of the present invention is a method of measuring brake dust produced from a brake while a specimen having the brake is placed in a chamber. The brake dust measurement method includes a sampling step of sampling air inside the chamber, an elemental analysis step of performing elemental analysis of sampled air, and a calculation step of calculating an amount of brake dust contained in the sampled air on the basis of elemental analysis results obtained in the elemental analysis step and an elemental content information of a single or multiple elements contained in the brake.

Accordingly, the amount of brake dust contained in the sampled air is calculated based on the elemental analysis results obtained by performing elemental analysis of the sampled air and also based on the elemental content information of the one or multiple elements contained in the brake. This can reduce the influence of rubber powder, metal powder, foreign matter, or the like. As a result, the amount of brake dust produced can be measured accurately.

The brake includes a brake rotor that is a rotating body and a brake pad that presses the brake rotor.

The brake pad is more vulnerable to wear than the brake rotor. Accordingly, accurately measuring the amount of brake dust produced from the brake pad improves the practicality of the brake dust measurement system. Accordingly, it is conceivable that the storage unit stores elemental content information of at least one element contained in the brake pad, and the calculation unit calculates an amount of brake dust produced due to wear of the pad.

Although the amount of brake dust produced from the brake rotor is smaller than that of the brake pad, measuring the amount of brake dust produced from the entire brake further improves the practicality of the brake dust measurement system. Accordingly, it is conceivable that the storage unit stores elemental content information of at least one element contained in the brake rotor, and the calculation unit calculates an amount of brake dust produced due to wear of the rotor.

The sampled air may contain error-inducing components other than the brake dust. It is conceivable that, to reduce the amount of the error-inducing components, the chamber includes an enclosed space in which the specimen is placed.

With this configuration, however, sampling by the sampling unit changes the pressure inside the chamber, which leads to a problem, such as changes in measurement conditions.

To overcome this problem suitably, it is desirable that the chamber be equipped with a pressure-fluctuation absorbing mechanism that absorbs pressure fluctuation in the enclosed space by supplying or discharging air in response to the pressure fluctuation caused by the sampling of the sampling unit.

To measure the amount of brake dust produced from the entire brake, it is desirable that the calculation unit calculate a total amount of brake dust produced from the brake from the amount of brake dust contained in the sampled air on the basis of a volume of the chamber and a cumulative amount of flow of the sampled air.

To accurately measure the amount of brake dust produced from the entire brake in divisions of a measurement test of the specimen, it is desirable that the brake dust measurement system further include a weight difference acquisition unit that acquires a weight difference between the brake before the measurement test of the specimen and the brake after the measurement test of the specimen. In addition, it is desirable that the calculation unit calculate a cumulative total of the amount of brake dust contained in the sampled air in the measurement test and also calculate a ratio of the weight difference to the cumulative total, and that, the calculation unit subsequently calculate amounts of brake dust produced from the brake in respective sections of the measurement test by multiplying amounts of brake dust contained in the sampled air in the respective sections by the ratio of the weight difference.

Advantageous Effects of Invention

According to the brake dust measurement system configured as described above, the amount of brake dust contained in the sampled air is calculated based on the elemental analysis results obtained by analyzing the sampled air and also based on the elemental content information of the one or multiple elements contained in the brake, which enables the amount of brake dust produced to be measured accurately.

Figure 1:
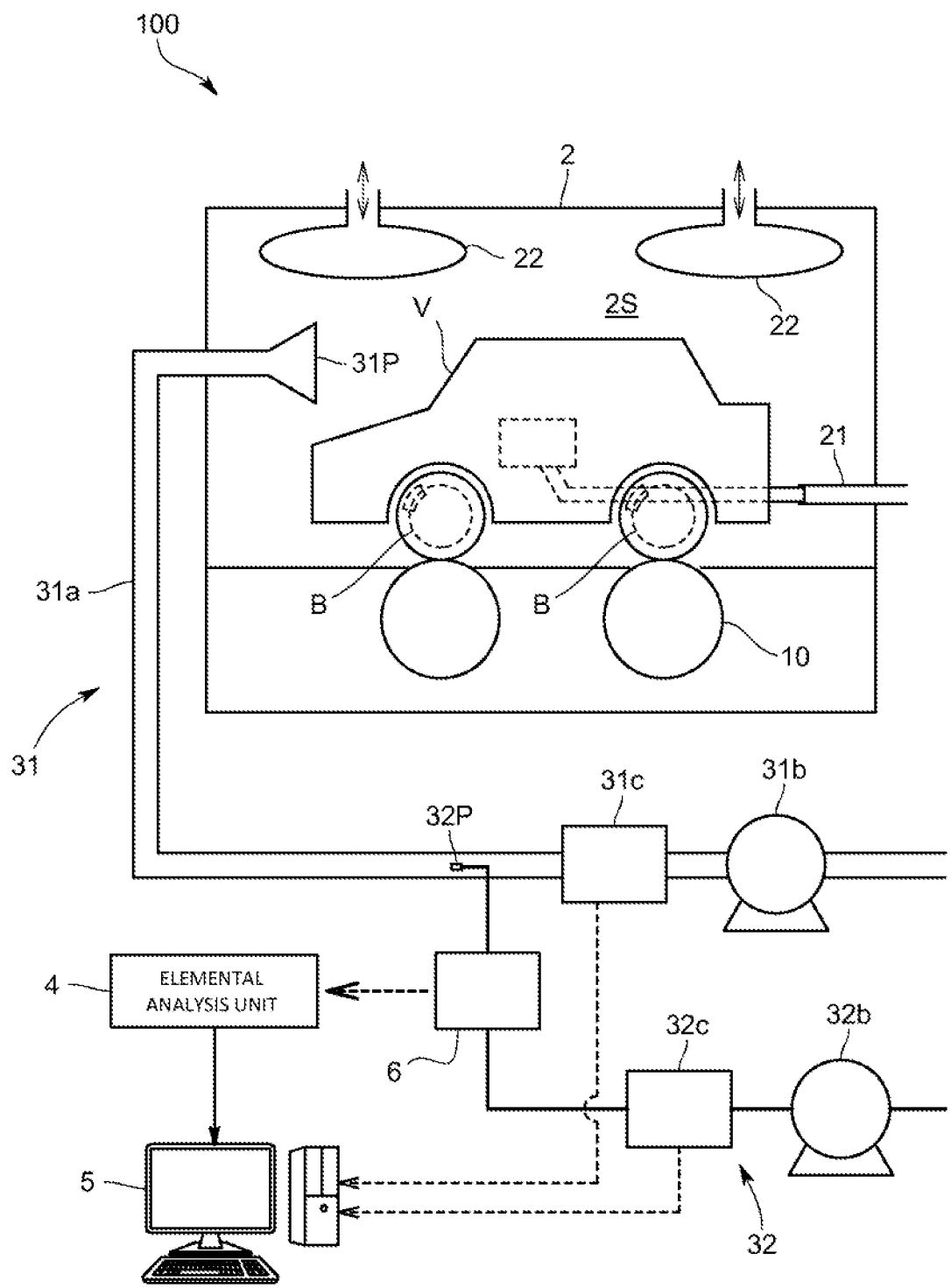
FIG. 1 is a schematic diagram illustrating an entire brake dust measurement system according to an embodiment.
Figure 2:
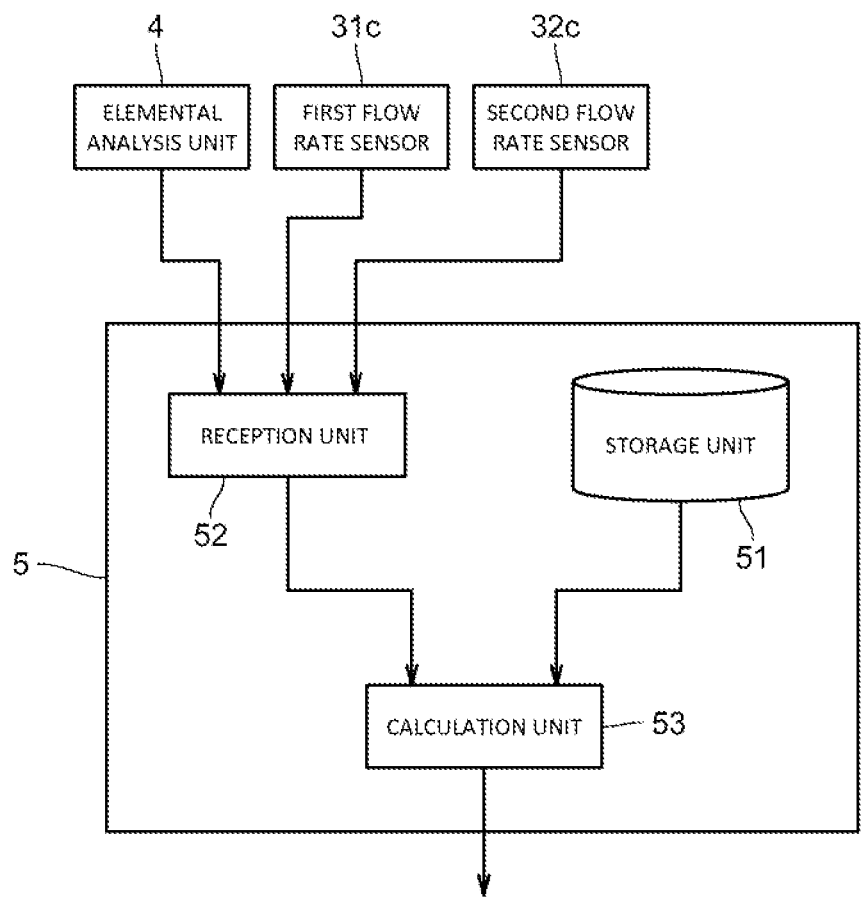
FIG. 2 is a block diagram illustrating functions of an arithmetic and logic unit according to the embodiment.

REFERENCE SIGNS LIST 100 brake dust measurement system
B brake
V test vehicle (specimen)
2 chamber
2S enclosed space
21 pressure-fluctuation absorbing mechanism
31 sampling unit
4 elemental analysis unit
51 storage unit
53 calculation unit
54 weight difference acquisition unit

DESCRIPTION OF EMBODIMENTS

An embodiment of a brake dust measurement system according to the present invention will be described with reference to the drawings.

A brake dust measurement system 100 according to the present embodiment has a chamber 2 in which a specimen equipped with a brake B is placed. The brake dust measurement system 100 measures brake dust produced by the brake B.

As described below, the brake dust measurement system 100 is a system that measures brake dust while the specimen, or a test vehicle V, is run on a chassis dynamometer 10.

The chassis dynamometer 10 is equipped, for example, with a rotating drum 11 on which driving wheels of the test vehicle V are placed. As illustrated, the chassis dynamometer 10 has respective rotating drums 11 for front wheels and rear wheels of the test vehicle V. However, the rotating drum 11 may be provided either for the front wheels or for the rear wheels.

The brake dust measurement system 100 includes the chamber 2, a sampling unit 3, an elemental analysis unit 4, and an arithmetic and logic unit 5. The test vehicle V, or the specimen, equipped with the brake B is placed in the chamber 2, and the sampling unit 3 samples air in the chamber 2. The elemental analysis unit 4 performs elemental analysis of the air sampled by the sampling unit 3, and the arithmetic and logic unit 5 calculates the amount of brake dust on the basis of the elemental analysis results of the elemental analysis unit 4.

The chamber 2 includes an enclosed space 2S that is substantially sealed and in which the test vehicle V is placed. The chamber 2 is equipped with a discharge mechanism 21 that discharges the exhaust gas of the test vehicle V to the outside of the chamber 2. The discharge mechanism 21 is piping that communicates the exhaust pipe of the test vehicle V with the outside of the chamber 2.

The chamber 2 is also equipped with a pressure-fluctuation absorbing mechanism 22 that supplies or discharges air in response to pressure fluctuation caused by sampling of the sampling unit 3, which will be described later. The pressure-fluctuation absorbing mechanism 22 thereby absorbs the pressure fluctuation in the enclosed space 2S. The pressure-fluctuation absorbing mechanism 22 is formed as a bag having an opening in communication with air outside the chamber 2. When the pressure inside the enclosed space 2S decreases, the bag takes in the outside air and inflates, whereas when the pressure inside the enclosed space 2S increases, the bag discharges the air to the outside. The pressure fluctuation in the enclosed space 2S is thereby absorbed. The number of bags is not limited to two but may be one or may be three or more. The positions at which these bags are installed are not limited to positions at the upper wall but may be at the side walls or the lower wall. Alternatively, the pressure-fluctuation absorbing mechanism 22 may be configured to have an elastic body that expands or contracts in accordance with pressure fluctuation in the enclosed space 2S.

The sampling unit 3 samples air inside the chamber 2. In the present embodiment, the air in the chamber 2 is sampled in two stages. Accordingly, the sampling unit 3 includes a first-stage collection unit 31 that samples a large amount of air and a second-stage collection unit 32 that samples a portion of the air collected by the first-stage collection unit 31.

The first-stage collection unit 31 includes a first collection pipe 31a of which one end (a first collection port 31P) opens inside the chamber 2 and also includes a first suction pump 31b that is disposed at the first collection pipe 31a and draws air through the first collection port 31P. A first flow rate sensor 31c is also disposed at the first collection pipe 31a to measure the flow rate of the air flowing through the first collection pipe 31a.

The second-stage collection unit 32 includes a second collection pipe 32a of which one end (a second collection port 32P) opens inside the first collection pipe 31a and also includes a second suction pump 32b that is disposed at the second collection pipe 32a and draws air through the second collection port 32P. A second flow rate sensor 32c is also disposed at the second collection pipe 32a to measure the flow rate of the air flowing through the second collection pipe 32a.

The first collection port 31P is disposed inside the chamber 2 at a position at which the brake dust produced by the brake B can be captured efficiently. For example, it is conceivable that the first collection port 31P is disposed at a position near the brake B or under the test vehicle V or is disposed at a position downstream in air flow with respect to the test vehicle V or at a position above the test vehicle V. In FIG. 1, the first collection port 31P is disposed in front of and above the test vehicle V, but the disposed position is not limited to this example. Alternatively, the first collection port 31P may be disposed at each of the brakes B for respective tires of the test vehicle V. The first collection port 31P may be formed, for example, into a funnel-like capture probe.

A capture filter 6 is disposed at the second collection pipe 32a of the second-stage collection unit 32 to capture brake dust contained in the air sampled by the second collection port 32P.

The capture filter 6 is provided to capture particles contained in the sampled air. The capture filter 6 may be a separate batch-type filter or may be a rolled filter wound in a supply roll and in a winding roll. For example, the capture filter 6 may be made of polytetrafluoroethylene (PTFE) or glass fiber coated with PTFE.

The elemental analysis unit 4 performs elemental analysis of the air sampled by the sampling unit 3. Specifically, the elemental analysis unit 4 performs elemental analysis of the particles captured by the capture filter 6. The elemental analysis unit 4 is an x-ray fluorescence analysis device that performs elemental analysis by irradiating a sample with X-rays and detecting fluorescence X-rays produced. The sample here is the capture filter 6 with particles captured thereon. The elemental analysis unit 4 of the present embodiment is configured to quantitatively analyze the concentration (for example, mass concentration (%)) and the mass (g) of elements contained in the particles captured by the capture filter 6. If the capture filter 6 is a batch-type filter, the capture filter 6 is removed from the sampling unit 3 and placed in the elemental analysis unit 4 for elemental analysis. If the capture filter 6 is a rolled filter, the elemental analysis unit 4 is disposed near the capture filter 6, and the elemental analysis is performed without removing the capture filter 6 from the sampling unit 3. In such a case, the elemental analysis unit 4 may be formed as an apparatus with the rolled capture filter 6 incorporated therein (elemental analysis apparatus with a filter).

The arithmetic and logic unit 5 acquires data on elemental analysis results obtained by the elemental analysis unit 4 and calculates the amount of brake dust. The arithmetic and logic unit 5 is a single purpose or a general purpose computer equipped with a CPU, an internal memory, an input/output interface, an AD converter, and the like. In the arithmetic and logic unit 5, the CPU and other components collaborate with each other in accordance with a brake dust measurement program stored in the internal memory so that the arithmetic and logic unit 5 can function, for example, as a storage unit 51, a reception unit 52, and a calculation unit 53. These units 51 to 53 are described individually as follows.

The storage unit 51 stores information on the content of a single or multiple elements contained in the brake B. The content information is digital data that includes known concentration (for example, mass concentration (%)) of a single or multiple elements contained in the brake B. In addition to this, the digital data may include, for example, a composition ratio or content ratios of the single or multiple elements. A user may input the content information in advance, or the content information may be transmitted from a server or the like via the Internet. The storage unit 51 of the present embodiment stores the elemental content information on the single or multiple elements contained in a brake pad. Note that the storage unit 51 may store elemental content information on a single or multiple elements contained in a brake rotor.

The reception unit 52 receives elemental analysis information obtained by the elemental analysis unit 4. The elemental analysis information is digital data that includes measured concentrations (for example, mass concentrations (%)) of multiple elements contained in the particles captured by the capture filter 33. In addition to this, the digital data may include, for example, a composition ratio or content ratios of the multiple elements. The reception unit 52 transmits the received elemental analysis information to the calculation unit 53.

In addition, the reception unit 52 receives flow rate data of the air flowing through the first collection pipe 31a from the first flow rate sensor 31c and also receives flow rate data of air flowing through the second collection pipe 32a from the second flow rate sensor 32c. The reception unit 52 transmits the received flow rate data to the calculation unit 53.

The calculation unit 53 calculates the amount of brake dust contained in the sampled air on the basis of the elemental analysis information and the flow rate data received by the reception unit 52 and also of the content information stored in the storage unit 51.

More specifically, the calculation unit 53 calculates, from the elemental analysis information, the weight (g·m/s$^2$) of titanium (Ti), the weight (g·m/s$^2$) of copper (Cu), and the weight (g·m/s$^2$) of iron (Fe). The results are referred to as "$M_{Ti}$" for titanium, "$M_{Cu}$" for copper, and "$M_{Fe}$" for iron. For example, it is conceivable that the weight of each element is obtained by calculating the weight difference of the capture filter 6 before and after capturing the dust and subsequently by multiplying the calculated weight difference by the content ratios of elements obtained using the elemental analysis device. Alternatively, it is conceivable that the capture filter 6 after capturing the dust is irradiated, for example, with β-rays, and the weight of the captured dust is calculated from the intensity of β-rays transmitted through the capture filter 6. The weight of each element can be subsequently obtained by multiplying the weight of the captured dust by the content ratios of elements obtained using the elemental analysis device.

The content ratios of titanium, copper, and iron are measured in weight percentage (%) in advance using the elemental analysis device. The results are referred to as "$R_{Ti}$ %" for titanium, "$R_{Cu}$ %" for copper, and "$R_{Fe}$ %" for iron. Note that the content ratios of titanium, copper and iron are stored as content information in the storage unit 51.

Let X (litter/minute) be the sampling flow rate of the second-stage collection unit 42 (i.e., flow rate data obtained by the second flow rate sensor 32c), Y (m$^3$/minute) be the sampling flow rate of the first-stage collection unit (i.e., flow rate data obtained by the first flow rate sensor 31c), and T (minute) be the sampling duration of the second-stage collection unit 42.

The calculation unit 53 calculates the amount (g·m/s$^2$) of brake dust contained in the sampled air by using the following equation.

The amount ($m_P$) of dust produced from the brake pad:

$$m_P = [\text{average of } M_{Ti}/R_{Ti} \text{ and } M_{Cu}/R_{Cu}] \times (Y \times 1000/X) \times T$$

In the present embodiment, an accurate amount ($m_P$) of brake pad dust can be obtained by averaging the amount calculated from the weight measurement result of titanium and the amount calculated from the weight measurement result of copper. Note that the amount of brake pad dust may be calculated from one of the weight measurement results without calculating the average.

The amount ($m_D$) of dust produced from the brake rotor:

$$m_D = \{M_{Fe} \times (Y \times 1000/X) \times T\} - m_P \times R_{Fe}$$

The amount ($m_B$) of brake dust:

$$m_B = m_P + m_D$$

Note that the above-described amount of brake dust is the amount contained in the sampled air and does not include the amount of brake dust contained in the air that has not been sampled.

Accordingly, the calculation unit 53 can calculate a total amount ($m_{TOTAL}$) of brake dust produced from the brake B from the amount ($m_B$) of brake dust contained in the sampled air. The calculation is performed based on the volume ($V_O$) of the chamber 2 and the cumulative amount ($Q_S$) of flow of the sampled air by using the following method.

Total amount ($m_{TOTAL}$) of brake dust produced from the brake B:

$$m_{TOTAL} = m_B \times V_C/Q_S$$

According to the brake dust measurement system 100 of the present embodiment configured as described above, the amount of brake dust contained in the sampled air is calculated based on the elemental analysis results obtained by performing elemental analysis on the sampled air and also based on the elemental content information of the one or multiple elements contained in the brake. This can reduce the influence of rubber powder, metal powder, foreign matter, or the like. As a result, the amount of brake dust produced can be measured accurately.

Note that the present invention is not limited to the embodiment described above.

Figure 3:
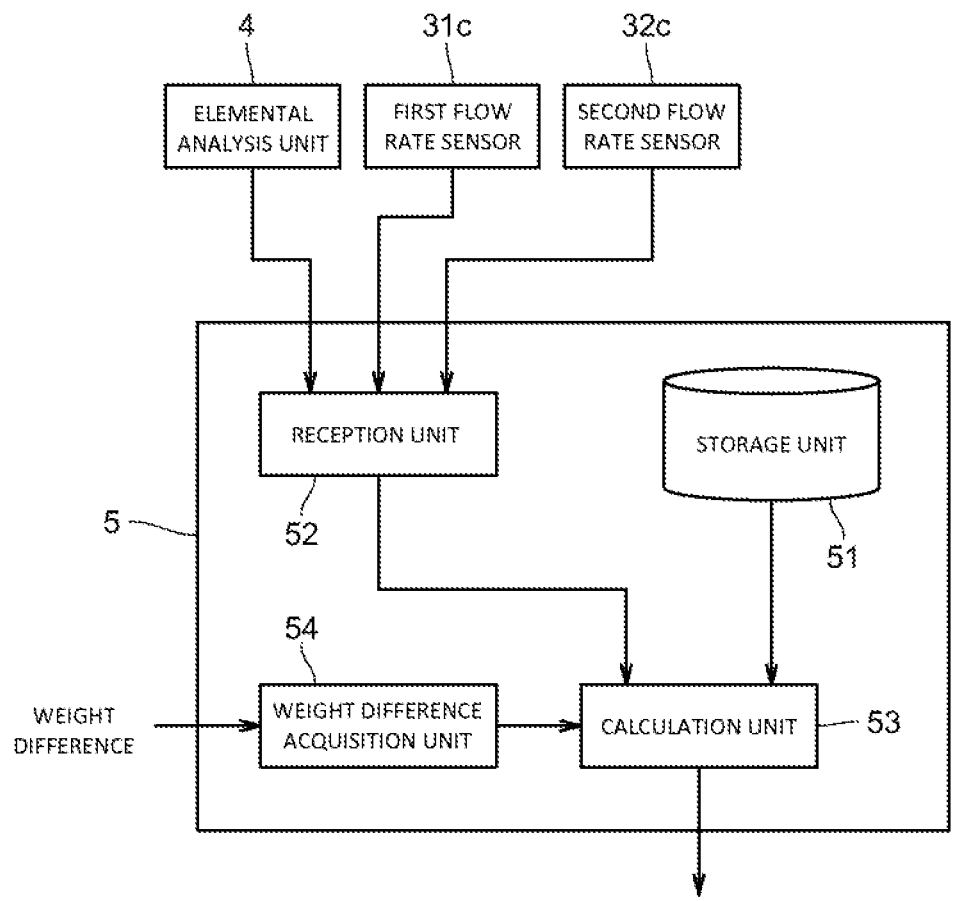
FIG. 3 is a block diagram illustrating functions of an arithmetic and logic unit according to a modified embodiment.

For example, as illustrated in FIG. 3, the arithmetic and logic unit 5 may further include a weight difference acquisition unit 54 that acquires a weight difference ($M_{diff}$) of the brake before and after the specimen is tested and may correct the amount of brake dust in accordance with the weight difference ($M_{diff}$).

More specifically, the calculation unit 53 calculates a cumulative total ($M_{all}$) of the amount of brake dust contained in the sampled air in the test and subsequently calculates a ratio of the weight difference ($M_{diff}$) to the cumulative total ($M_{all}$). In the case in which the amount of brake dust contained in the sampled air is obtained for each of sections in the test, the calculation unit 53 calculates the amount of brake dust produced from the brake in each section by multiplying the obtained amount of brake dust by the above ratio.

For example, a test may performed for Section 1, Section 2, and Section 3 that are obtained by division. Let $M_1$, $M_2$, and $M_3$ be amounts of brake dust contained in the sampled air in Sections 1 to 3. The cumulative total ($M_{all}$) of amount's of brake dust of these sections is: $M_{all} = M_1 + M_2 + M_3$.

When $M_{all}$ is equal to $M_{diff}$, this means that the total amount of the brake dust has been sampled.

Figure 4:
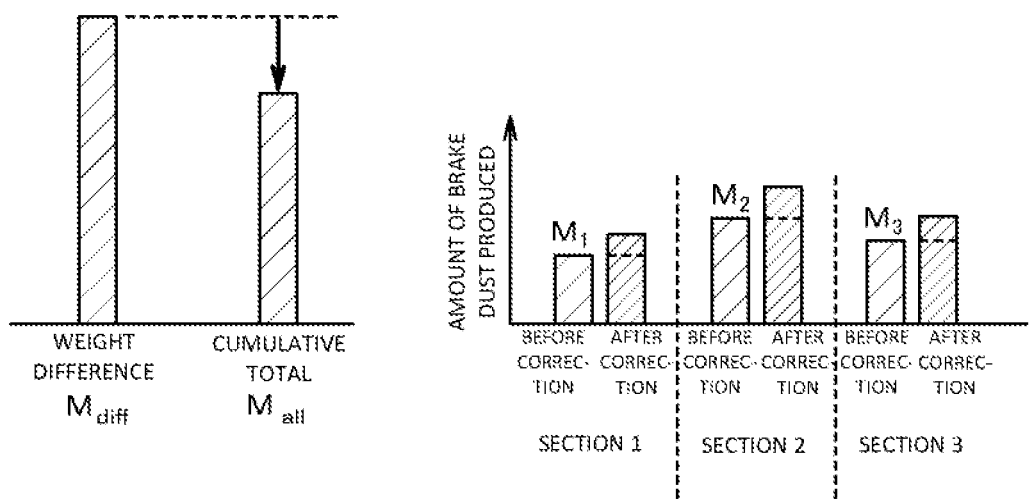
FIG. 4 is a graph for explaining a method of calculating an amount of brake dust in each section in a test.

On the other hand, when there is a difference between $M_{all}$ and $M_{diff}$ as illustrated in FIG. 4, the calculation unit 53 calculates a ratio (A) of $M_{diff}$ to $M_{all}$ (i.e., $M_{diff}/M_{all}=A$) and corrects the amounts of brake dust of Sections 1 to 3 by multiplying $M_1$, $M_2$, and $M_3$ by A, respectively (i.e., $M_1 \times A$, $M_2 \times A$, and $M_3 \times A$), to obtain the amounts of brake dust produced from the brake in Sections 1 to 3.

Figure 5:
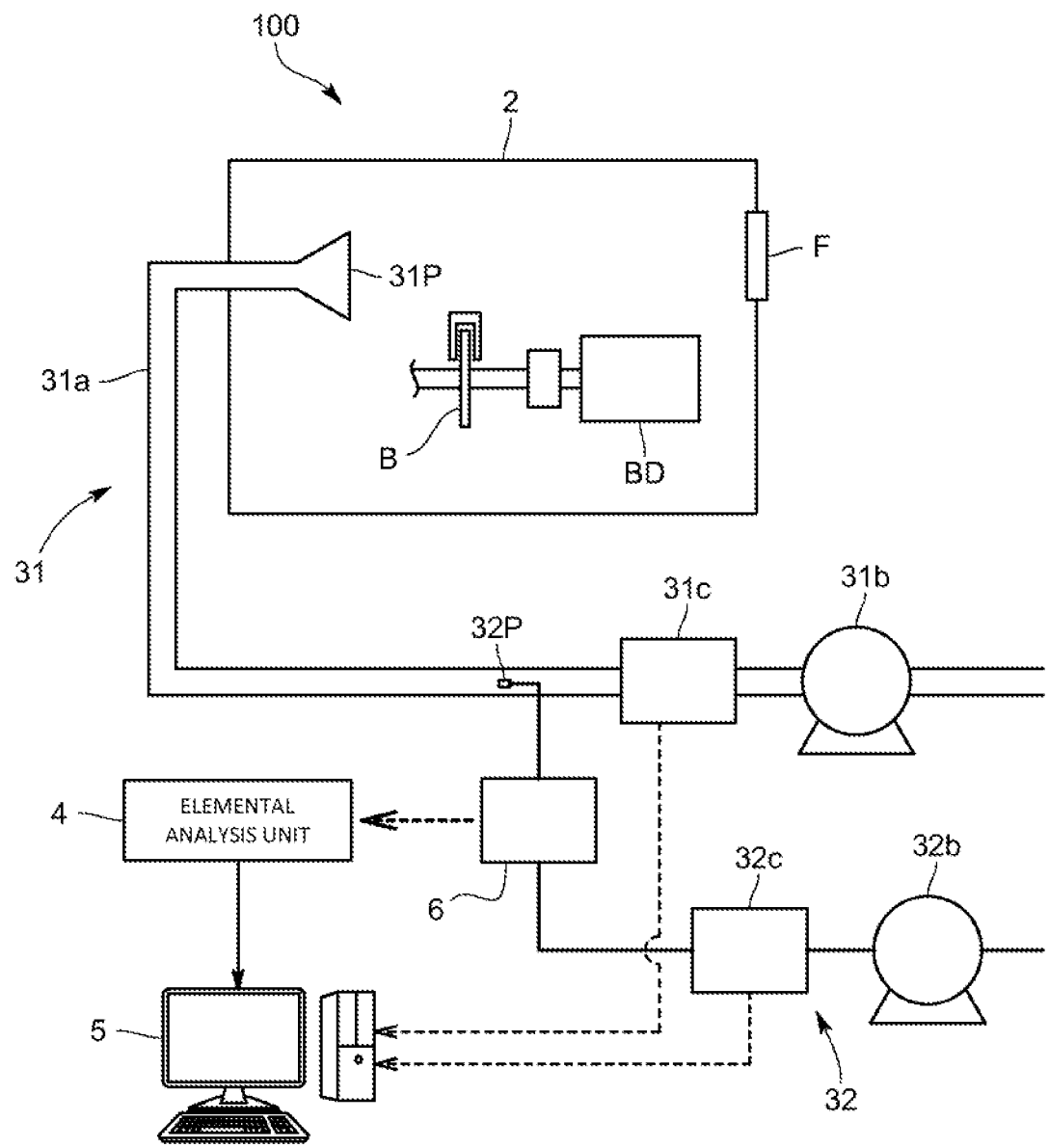
FIG. 5 is a schematic diagram illustrating an entire brake dust measurement system according to the modified embodiment.

In the above embodiment, a vehicle is run on the chassis dynamometer to measure the amount of brake dust. The amount of brake dust, however, may be measured with the brake B being attached to a brake dynamometer BD as illustrated in FIG. 5.

In the brake dust measurement system 100 using the brake dynamometer BD, an axial fan is disposed in the chamber 2 to control the wind around the brake rotor (brake rotor) so as to simulate the wind speed of a running car. This eliminates the necessity of setting the sampling point in the vicinity of the specimen (i.e., brake B). In addition, this can reduce the influence of the temperature of the brake rotor on the sampling. Brake dust can be readily dispersed off in the chamber 2 because a smaller number of structures to which the brake dust adheres are present except for the brake assembly in the chamber 2. In addition, the axial fan for cooling can disperse the brake dust readily. The air in the chamber 2 is cleaned air obtained using a dust filter F made, for example, of a high-efficiency particulate air (HEPA) filter. Moreover, tires are not used in the system, which reduces the number of dust sources and improves the efficiency of brake dust sampling.

A system including an exhaust gas sampling device and an exhaust gas analysis device may be used in combination with the brake dust measurement system of the above-described embodiment in which the vehicle is run on the chassis dynamometer. The exhaust gas sampling device collects the exhaust gas emitted from the running vehicle, and the exhaust gas analysis device analyzes predetermined components contained in the exhaust gas.

In the above embodiment, the amount of brake dust is obtained by measuring both the brake pad dust and the brake rotor dust. The brake dust measurement system, however, may be a system for measuring only the amount of brake pad dust. The brake may be a disk brake or a drum brake. In the case of the drum brake, the storage unit stores elemental content information on a brake shoe and/or a brake drum.

In the above embodiment, air is sampled in two stages by taking into account of the amount of air collected from the chamber and the flow rate of the air flowing through the capture filter. However, air may be sampled in a single stage.

In the above embodiment, the brake dust measurement system is described as a system for measuring the amount of brake dust of a four-wheel vehicle. The brake dust measurement system, however, may be a system for measuring the amount of brake dust of a two-wheel vehicle. The test vehicle V may be an engine-driven car, a hybrid car, an electric car, or a fuel cell car. Although the specimen is described as a completed vehicle in the above embodiment, the specimen may be part of a vehicle.

The arithmetic and logic unit may be a unit that can calculate the amount of brake dust by using a machine learning algorithm. For example, the arithmetic and logic unit includes a machine learning unit that learns from machine learning data sets formed of data representing amounts of brake dust and data representing elemental analysis results obtained by the elemental analysis unit 4. The arithmetic and logic unit calculates the amount of brake dust from the elemental analysis results obtained by the elemental analysis unit 4 by using a leaning model generated by the machine learning unit. Note that the learning model here may be generated by a different machine learning device other than the arithmetic and logic unit.

The present invention is not limited to the embodiment described above in various other points. It should be noted that the present invention may be modified or altered without departing from the scope of the invention.

INDUSTRIAL APPLICABILITY

The present invention can provide a brake dust measurement system that can accurately measure the amount of brake dust produced.

The invention claimed is:

1. A brake dust measurement system in which a specimen having a brake is placed in a chamber and that measures brake dust produced from the brake, the brake dust measurement system comprising:
    a sampling unit that samples air inside the chamber;
    an elemental analysis unit that performs elemental analysis of sampled air sampled by the sampling unit;
    a storage unit that stores elemental content information of a single or multiple elements contained in the brake; and
    a calculation unit that calculates an amount of brake dust contained in the sampled air in accordance with elemental analysis results of the elemental analysis unit, and the elemental content information, wherein the chamber includes an enclosed space in which the specimen is placed and wherein the chamber is equipped with a pressure-fluctuation absorbing mechanism that absorbs pressure fluctuation in the enclosed space by supplying or discharging air in response to the pressure fluctuation caused by sampling of the sampling unit.

2. The brake dust measurement system according to claim 1, wherein
    the storage unit stores elemental content information of at least one element contained in a pad of the brake, and
    the calculation unit calculates an amount of brake dust produced due to wear of the pad.

3. The brake dust measurement system according to claim 1, wherein
    the storage unit stores elemental content information of at least one element contained in a rotor of the brake, and
    the calculation unit calculates an amount of brake dust produced due to wear of the rotor.

4. The brake dust measurement system according to claim 1, wherein
    the calculation unit calculates a total amount of brake dust produced from the brake from the amount of brake dust contained in the sampled air in accordance with a volume of the chamber and a cumulative amount of flow of the sampled air.

5. The brake dust measurement system according to claim 1, further comprising:
    a weight difference acquisition unit that acquires a weight difference between the brake before a measurement test of the specimen and the brake after the measurement test of the specimen, wherein
    the calculation unit calculates a cumulative total of the amount of brake dust contained in the sampled air in the measurement test and a ratio of the weight difference to the cumulative total, and
    the calculation unit subsequently calculates amounts of brake dust produced from the brake in respective sections of the measurement test by multiplying amounts of brake dust contained in the sampled air in the respective sections by the ratio of the weight difference.

6. A brake dust measurement method of measuring brake dust produced from a brake while a specimen having the brake is placed in a chamber, the brake dust measurement method comprising:
    sampling air inside the chamber;
    performing elemental analysis of sampled air; and
    calculating an amount of brake dust contained in the sampled air in accordance with elemental analysis results obtained from performing the elemental analysis, and an elemental content information of a single or multiple elements contained in the brake, wherein the chamber includes an enclosed space in which the specimen is placed and wherein the chamber is equipped with a pressure-fluctuation absorbing mechanism that absorbs pressure fluctuation in the enclosed space by supplying or discharging air in response to the pressure fluctuation caused by the sampling.

7. A brake dust measurement system in which a specimen having a brake is placed in a chamber and that measures brake dust produced from the brake, the brake dust measurement system comprising:
    a sampling unit that samples air inside the chamber;
    an elemental analysis unit that performs elemental analysis of sampled air sampled by the sampling unit;
    a storage unit that stores elemental content information of a single or multiple elements contained in the brake; and
    a calculation unit that calculates an amount of brake dust contained in the sampled air in accordance with elemental analysis results of the elemental analysis unit and the elemental content information, wherein the calculation unit calculates a total amount of brake dust produced from the brake from the amount of brake dust contained in the sampled air in accordance with a volume of the chamber and a cumulative amount of flow of the sampled air.

8. The brake dust measurement system according to claim 7, wherein
    the storage unit stores elemental content information of at least one element contained in a pad of the brake, and
    the calculation unit calculates an amount of brake dust produced due to wear of the pad.

9. The brake dust measurement system according to claim 7, wherein
    the storage unit stores elemental content information of at least one element contained in a rotor of the brake, and
    the calculation unit calculates an amount of brake dust produced due to wear of the rotor.

10. The brake dust measurement system according to claim 7, wherein
    the chamber includes an enclosed space in which the specimen is placed, and
    the chamber is equipped with a pressure-fluctuation absorbing mechanism that absorbs pressure fluctuation in the enclosed space by supplying or discharging air in response to the pressure fluctuation caused by sampling of the sampling unit.

11. The brake dust measurement system according to claim 7, further comprising:
    a weight difference acquisition unit that acquires a weight difference between the brake before a measurement test of the specimen and the brake after the measurement test of the specimen, wherein the calculation unit calculates a cumulative total of the amount of brake dust contained in the sampled air in the measurement test and a ratio of the weight difference to the cumulative total, and the calculation unit subsequently calculates amounts of brake dust produced from the brake in respective sections of the measurement test by multiplying amounts of brake dust contained in the sampled air in the respective sections by the ratio of the weight difference.

\* \* \* \* \*